UNITED STATES PATENT OFFICE.

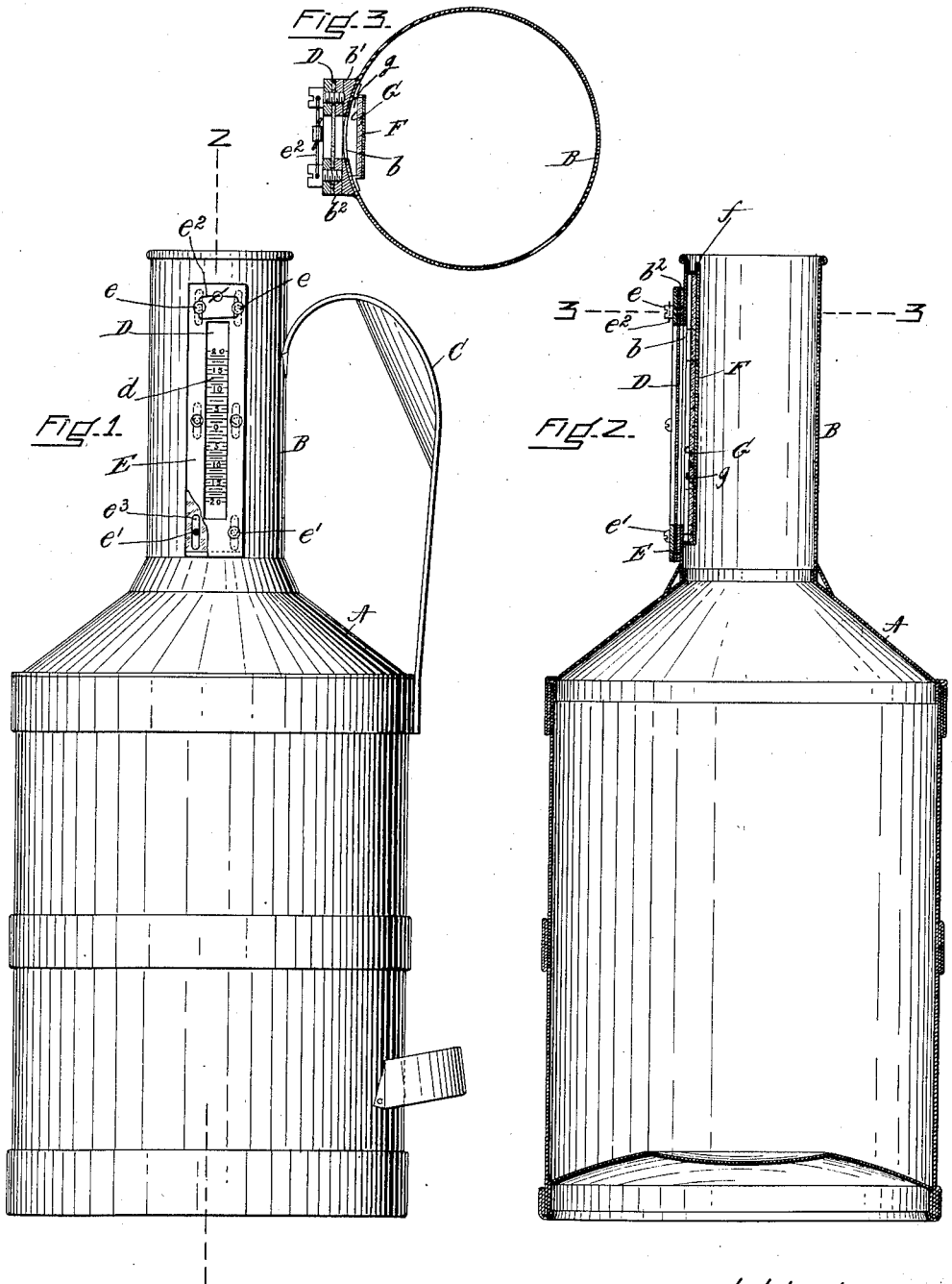

THURE HANSON, OF WORCESTER, MASSACHUSETTS, ASSIGNOR TO DOVER STAMPING & MANUFACTURING COMPANY, OF PORTLAND, MAINE, A CORPORATION OF MAINE.

MEASURING-CAN.

1,377,577.　　　Specification of Letters Patent.　　Patented May 10, 1921.

Application filed February 20, 1919. Serial No. 278,142.

*To all whom it may concern:*

Be it known that I, THURE HANSON, of Worcester, in the county of Worcester and State of Massachusetts, a citizen of the United States, have invented a new and useful Improvement in Measuring-Cans, of which the following is a specification.

My invention relates more particularly to cans to be used in testing liquid measures and more particularly in testing gasolene measuring pumps, although it has other uses.

It is well known that at the present time gasolene stations for automobiles are often provided with pumps which professedly measure out a certain amount of gasolene with each stroke of the pump, the gasolene being sold according to the quantity so measured. These pumps are not always accurate and, if upon a test one stroke of the pump produces more or less of the given quantity, say five gallons, which it is presumed to give, the calculation of the shortage or wastage can only be made by some considerable mathematical calculation.

My invention is intended to overcome this necessity by the addition to a testing can of means such as a gage whereby the exact amount of the shortage or wastage may be determined at a glance after, for example, the can has been filled say by one stroke of the pump.

My invention will be understood by reference to the drawings in which it is shown in its preferred form.

Figure 1 is an elevation of the can embodying my invention;

Fig. 2 being a vertical section thereof on line 2—2 of Fig. 1, and

Fig. 3 a cross section on line 3—3 of Fig. 2.

The can itself comprises a body A, a neck B and a handle C, all of usual construction, except as the gage is applied to the neck. The neck is slotted as at $b$ and thickened to form a rim as at $b^1$ around the slot. To close the slot I have provided a gage D made preferably of celluloid or other transparent or translucent material upon which are marked as at $d$ a series of horizontal lines and figures representing preferably a zero point, which, when the liquid in the can is at that level, indicates that the can contains its normal amount of liquid, that is to say, for example, 5 gallons exactly. The lines and figures above the zero point indicate units which may be fractions of a pint or of a quart or any other desired amount and so gaged that, if the level of liquid in the can reaches, for example, the figure 10, it will show that the can contains 10 half pints beyond the amount desired, that is (to take the example of the gasolene pump), instead of delivering 5 gallons, which one stroke of the pump is intended to deliver, it is delivering 5 gallons plus 5 pints.

In the same way the lines and figures below the zero point indicate the shortage. For example, if the level of the liquid which has been pumped into the can reaches say the line 15 below the zero point, it will mean that the pump is giving short measure.

A packing $b^2$ of some suitable material lies between the gage D and the rim $b^1$.

To hold the gage in place I provide a frame E which, by means of screws $e$ and $e^1$ clamps the gage tightly in place against the packing and rim. In order to prevent tampering with the gage I preferably perforate the heads of the screws $e$ and pass a wire $e^2$ through the holes in these screw heads (see Fig. 3) the ends of which are sealed with a lead seal or otherwise.

The screws $e$ and $e^1$ pass not only through the frame E, packing $b^2$ and rim $b^1$ but also through suitable openings or slots $e^3$ in the gage material.

As it is well known that a can of this character may receive somewhat rough usage and become dented, so that its capacity is lessened, it is necessary in such cases that the gage shall be adjustable, and for this purpose I provide the gage with the slots $e^3$ through which the screws $e$ and $e^1$ will be passed. Thus the tester or sealer or other person by whom the can is used, when he finds that his can has become dented, or from time to time as he sees fit, may put into the can the unit of measurement, say 5 gallons of water or other liquid, and breaking the wire $e^2$ and unscrewing the screws $e$, $e^1$ can adjust the gage vertically so that the zero point comes exactly to the level of the liquid. He may then screw up the screws again, clamp the gage in place and seal two of the screws, for example, the screws $e$, in such a way that the position of the gage cannot be changed. Other means of sealing the gage may be used.

In addition it is desirable that some background other than the liquid itself be provided in order that the gage may be accurately read. For this purpose I provide inside the can neck and behind the slot *b* a pocket F, preferably metallic, into which can be slipped a piece of white porcelain glass G preferably, or any other material, which will not be attacked by the liquid in the can. The upper end of this pocket is preferably closed by a spring closure *f* of any character suitable to hold the porcelain glass piece in place. As shown the pocket F is made of spring metal and soldered to the edge of the slot at its bottom and up the sides nearly to the top of the slot. Its top is bent out toward the interior of the neck as shown at *f* to form a top for the pocket and enough of the top of the pocket is left disconnected from the neck B to allow the part *f*, springing away from the neck to allow the piece G to be removed or replaced.

The construction of the pocket F is such that the liquid has free access to the back of the gage D for example by springs as by openings *g* or otherwise.

It will be evident to anyone skilled in the art that this invention can be embodied in other forms, but the form shown has proved in practice to be very simple and exceedingly useful, as it does not necessitate any calculation on the part of the tester of measures, but will give him at a glance an indication of the accuracy of the pump or other measures that he is testing. Moreover, although I have specified that a gage arrangement of this character is particularly useful to a tester of measures, it may of course be used equally satisfactorily as a can in which liquids are to be measured out for sale.

What I claim as my invention is:—

1. A measuring can having a body and a neck, said neck having a slot in the wall thereof, a translucent gage mounted to close said slot from leakage, the rear of said gage being adapted to be in contact with the contents of said can, said gage being adjustable vertically whereby it may be adjusted at any time to measure accurately the contents of said can.

2. A measuring can having a body and a neck, said neck having a slot in the wall thereof, a translucent gage mounted to close said slot from leakage, the rear of said gage being adapted to be in contact with the contents of said can, and a plate immediately in rear of said gage whereby the figures on said gage may be read in comparison with the height of the contents of the can.

3. A measuring can having a slot in one wall thereof, a frame surrounding said slot and a gage located between said can and said frame and held in place by screws passing through said frame and said gage, said gage having slotted openings for said screws whereby its location may be adjusted.

4. A measuring can having a slot in one wall thereof, a frame surrounding said slot and a gage located between said can and said frame and held in place by screws passing through said frame and said gage, said gage having slotted openings for said screws whereby its location may be adjusted, and means for locking said gage in place whereby its location cannot be changed without interfering with said lock.

5. A measuring can having a slot located in one wall thereof, a translucent gage located to close said slot, a pocket located within said can and in rear of said gage, and a plate located in said pocket, said pocket being constructed to allow the contents of said can to have free access to the rear of said gage.

6. A measuring can having a slot located in one wall thereof, a translucent gage located to close said slot, a pocket located within said can and in rear of said gage, and a plate located in said pocket, said pocket being constructed to allow the contents of said can to have free access to the rear of said gage, said pocket having a closure at its upper end.

THURE HANSON.